Jan. 23, 1934.  A. H. SCHMIDTKE  1,944,374
CONVEYER CHAIN
Filed Oct. 24, 1931
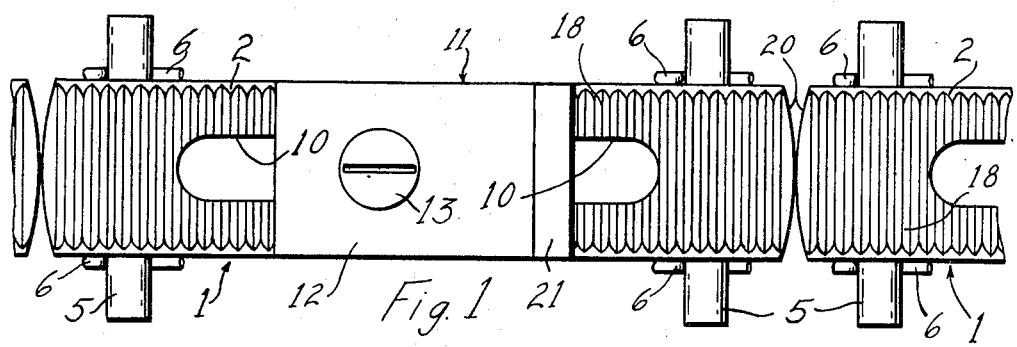
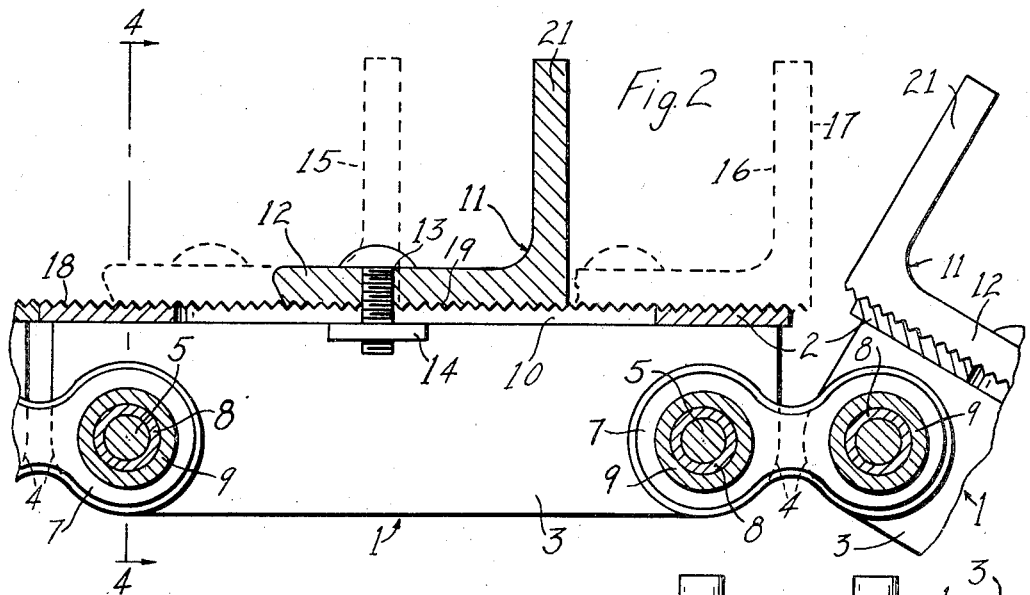
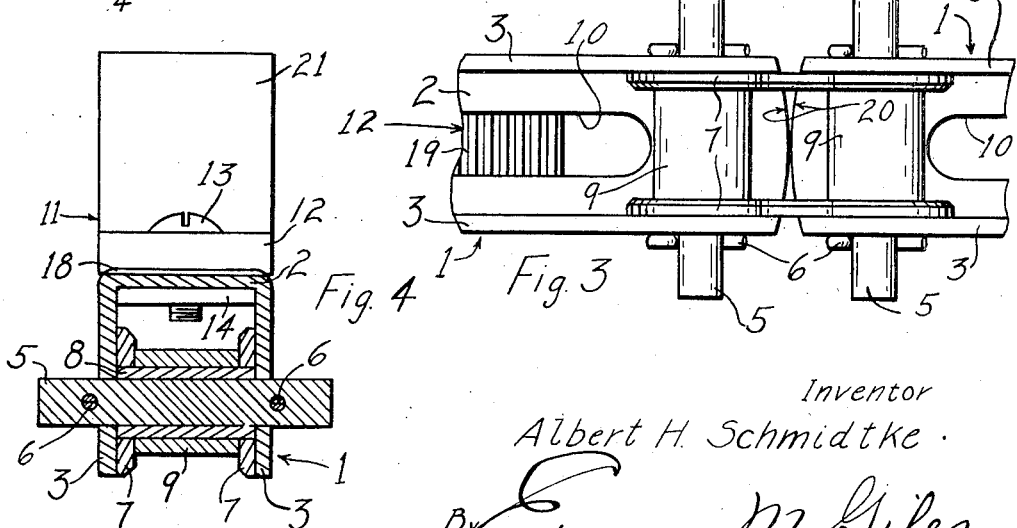
Inventor
Albert H. Schmidtke
By Eugene M. Giles
Atty.

Patented Jan. 23, 1934

1,944,374

UNITED STATES PATENT OFFICE 1,944,374

CONVEYER CHAIN

Albert H. Schmidtke, St. Joseph, Mich., assignor to St. Joseph Iron Works, St. Joseph, Mich., a corporation of Michigan Application October 24, 1931. Serial No. 570,849

5 Claims. (Cl. 198—173)

My invention relates to chains of the type which are adapted to operate around sprockets and has reference more particularly to a construction wherein the chain links are adapted to have pusher lugs attached thereto for feeding material, as for example, strips and panels to stapling machines to be operated upon by the latter.

The principal objects of my invention are to provide an improved chain construction; to provide an improved pusher lug for feed chains; to permit location of pusher lugs at any place throughout the length of the chain; to insure secure attachment of the lug to the chain in any position of adjustment; to provide an improved method of making the chain and pusher lugs; and in general to simplify the construction, minimize the cost and produce a more satisfactory feed chain than has been available heretofore.

On the drawing:—

Fig. 1 is a plan view of a short section of feed chain made in accordance with my invention;

Fig. 2 is a central longitudinal sectional view of a chain section with a portion of one link and the lug attached thereto in the position assumed in passing around a sprocket;

Fig. 3 is a bottom view of the connected ends of two adjoining links; and

Fig. 4 is a vertical cross sectional view of the feed chain taken substantially on the line 4—4 of Fig. 2.

Referring to the drawing, the reference numeral 1 indicates the individual chain links, each of which is in the form of an elongated channeled member having a flat top wall 2 with a depending flange 3 at each side extending substantially the full length of the link, the lower corners at the ends of these flanges 3 being rounded as indicated by dotted lines at 4 in Fig. 2 to permit free pivotal movement of adjoining links. The side flanges of each link are provided adjacent each end with aligning apertures to receive short shafts or stems 5, which are held in place by cotters 6 and engage through end bearings of intermediate links which serve to connect the chain links 1. These intermediate links may be of any desired construction, those shown here comprising side plates 7 which are secured together at their ends in fixed spaced relation by bearing sleeves 8 which have a press fit at their ends in apertures of the respective plates 7 and have a bearing fit on the shafts or stems 5, a roller 9 being mounted on each sleeve 8 between the plates 7 to co-operate with the sprocket teeth which engage between the plates 7 and the rollers 9 of the intermediate links.

The connector plates 7 may be arranged at the outer sides of the flanges 3 of the chain links 1 if desired, in which case the cotters 6 are spaced outwardly from said flanges to accommodate the plates 7 therebetween and the rollers 9 may then extend the full distance between the inner surfaces of the side flanges 3 of the links 1.

For attaching pusher lugs to these chain links 1, the top wall 2 of each link has a longitudinal slot 10, and each pusher lug, indicated at 11, has an upright pusher portion 21 and a flat foot portion 12 which latter is apertured to receive the bolt 13 which extends downwardly through the slot 10 and engages the nut 14 which is preferably of rectangular form and fits sufficiently snugly between the flanges 3 to be held by the latter against turning. Thus by reason of the slot 10 and the bolted connection of the pusher lug with the link 1, the lug 11 may be adjusted and clamped in various positions along the link 1 as desired, the length of the slot 10 being such that when the lug is arranged as shown on the horizontal link 1 of Fig. 2, the lug 11 may be adjusted from the position shown by dotted lines at 15 to the position shown by dotted lines at 16, wherein the face 17 of the pusher portion 21 of the lug is slightly beyond the extreme end of the link 1 on which it is mounted, and by turning the lug 11 around to the position shown on the angular link 1 of Fig. 2 the lug may be adjusted on its link 1 to project beyond the end of said link sufficiently so that there is no place along the chain at which a pusher lug may not be effectively located, the overhanging arrangement of the lug as shown at the right of Fig. 1 being possible without interfering with the operation of the chain around the sprockets in view of the direct pulling apart of the top wall portions 2 of adjoining links 1 in turning around the sprocket. The use of the chain with the lugs turned around to either position is also possible in view of the fact that chains of this character are usually employed with guides along which the material is slid by the pusher lugs 11 and the foot portions 12 and heads of the bolts 13 are below the upper edges of these guides.

To insure positive holding of the lug in the various positions of adjustment the top surface of the top wall 2 of each link is provided with transverse serrations 18 and the bottom surface of the foot portion 12 of the lug is correspondingly serrated as indicated at 19 so that when the lug 11 is bolted to the chain link the serrations of the lugs and links interengage and lock the lug against turning and displacement from its position of adjustment.

The lugs or pusher members 11 employed in connection with this chain may be of any shape or size and spaced on the chain as required for the particular work. The present lug 11, which is suitable for ordinary purposes, may be made in any desired manner as for example by stamping out of a sheet metal blank, but is preferably made by cutting an angle iron of the desired size into short lengths equal substantially to the width of the links 1. The links 1 may also be made in any desired manner but I prefer to stamp them out of sheet metal blanks into the required channel form.

When the links 1 are connected by the connector links 7—8 as shown herein, the ends of the top walls 2 of the adjoining links, which said ends are preferably slightly curved as shown at 20, are in substantially abutting relation as shown at the left of Figs. 1 and 2 when the chain is stretched straight out, and the top walls 2 of the series of links form substantially a continuous surface along which the lugs 11 may be placed in any desired position.

While I have shown and described my invention in a preferred form I am aware that various changes and modifications may be made without departing from the principles of my invention, the scope of which is to be determined by the appended claims.

I claim as my invention:

1. In a chain of the class described the combination of a series of link members each having an elongated top wall with a depending flange at each side thereof, and means pivotally connecting the flanges at each end of the link members with the flanges of the next adjoining link members, the top wall of each link member having a longitudinal slot, pusher lugs mounted on and adjustable along the slots of the top walls of the link members, and means between said depending flanges and connected through the top wall slot with the pusher lug and clamping the latter onto the top wall of the link member.

2. In a chain of the class described the combination of a series of link members each consisting of a sheet metal plate with an elongated top wall portion and side wall portions integral with and extending downward along each side of said top wall portion to form side flanges and one of said wall portions being provided with a longitudinal slot, means pivotally connecting the side flanges of adjoining link members, and pusher lugs mounted on and adjustable lengthwise of the link members and secured to the slotted wall portion of the respective link member by means extending through the slot and into the space between the side flanges.

3. In a chain of the class described the combination of a link member having an elongated top wall with a depending flange at each side thereof and a longitudinal slot in the top wall, means for pivotally connecting the depending flanges of the link member to depending flanges of adjoining link members, a nut fitting between the depending flanges and held thereby against turning, a lug mounted on the top wall of the link member, and a threaded member extending through the slot and having a threaded engagement with the nut adjustably securing the lug to the link member.

4. In a feed chain, the combination of main link members each having a serrated longitudinally slotted top wall with a depending flange along each side, an auxiliary link member pivotally connecting adjacent main link members and having a sprocket tooth opening therein, one or more of said main link members having a nut fitting between and held from turning by the depending flanges, a lug with a serrated surface engaging the serrated top wall of the main link member, and a threaded member connected with the lug and projecting through the slotted top wall of the member and having a threaded connection with the nut between the depending flanges.

5. In a chain of the class described the combination of a series of pivotally connected link members each having a longitudinal recess in the under side and a transversely serrated top face with a longitudinal slot, a pusher member on and adjustable lengthwise of said top face, a nut adjustable lengthwise and held against turning movement in the longitudinal recess of the link member, and a threaded member engaging through the slot and connecting the pusher member and the nut.

ALBERT H. SCHMIDTKE.